Patented Aug. 10, 1926.

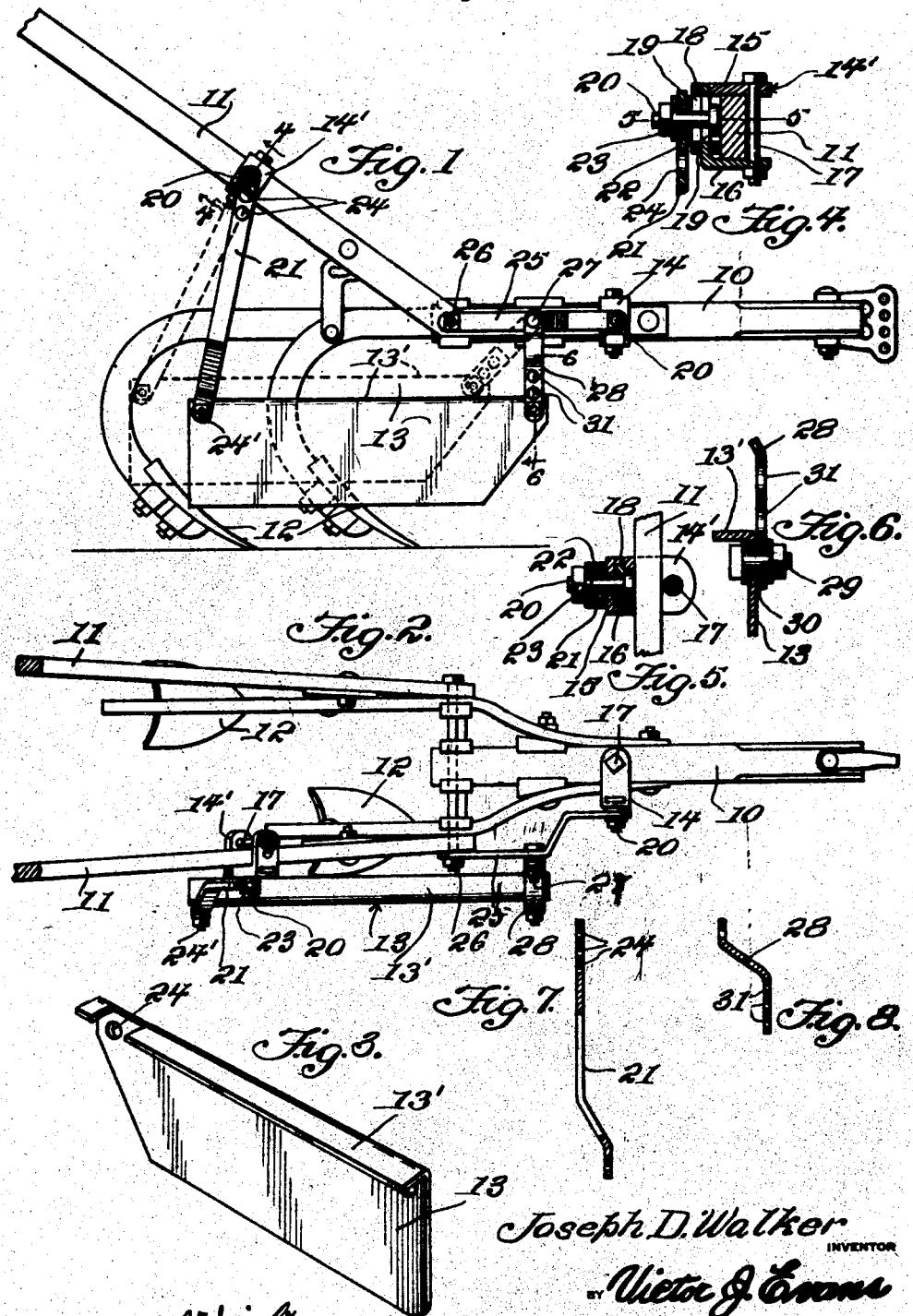

1,595,270

UNITED STATES PATENT OFFICE.

JOSEPH D. WALKER, OF WHITESBURG, TENNESSEE.

PLOW ATTACHMENT.

Application filed August 19, 1925. Serial No. 51,223.

This invention relates to attachments for cultivators or plows and has for an object the provision of a guard plate which is adapted to be secured to a cultivator or plow for the purpose of protecting growing plants when the latter are being cultivated.

Another object of the invention is the provision of means for attaching the plate to the cultivator in a manner to permit of the said plate riding upward to facilitate its passage over obstructions without damage to the plate and thereafter permitting the plate to move downward into proper active position.

Another object of the invention is the provision of means especially adapted for attaching the plate to a walking cultivator, together with novel means for adjustably securing the guard plate in place.

With the above and other objects in view, the invention further includes the following novel features and details of construction, to be hereinafter more fully described, illustrated in the accompanying drawings and pointed out in the appended claims.

In the drawings:—

Figure 1 is a side elevation of a cultivator with the invention applied.
Figure 2 is a top plan view of the same.

Figure 3 is a detail perspective view of the guard plate with a portion of its flange broken away.

Figure 4 is an enlarged fragmentary sectional view on the line 4—4 of Figure 1.

Figure 5 is a fragmentary section on the line 5—5 of Figure 4.

Figure 6 is an enlarged fragmentary sectional view on the line 6—6 of Figure 1.
Figure 7 is a detail edge view of the rear hanger arm.

Figure 8 is an edge view of the front hanger arm.

Referring to the drawings in detail wherein like characters of reference denote corresponding parts, the reference character 10 indicates the beam of the cultivator which is provided with handles 11 and shovels 12. The cultivator illustrated is only one of many types to which the invention may be applied and it is not the purpose of the present application to limit the invention in this respect.

The invention comprises a plate 13 which is adapted to be positioned longitudinally of the cultivator and is provided along one edge with a stiffening flange 13' so that the plate may be made of relatively thin material. For the purpose of attaching the plate there is provided a front attaching bracket 14 and a rear attaching bracket 14' which are substantially alike in construction in that each of the brackets includes a pair of substantially L-shaped members 15 and 16. These members 15 and 16 are provided with openings for the passage of a bolt 17 which, in the front bracket is adapted to be passed through the beam 10 while in the rear bracket the bolt 17 extends downwardly upon the inside of one of the cultivator handles as shown in Figures 4 and 5 of the drawings. The member 15 has one of its arms provided with a longitudinally disposed slot or opening 18 for the reception of one arm of the member 16 and both of these members are provided with elongated slots 19 for the passage of bolts 20.

The rear bracket 14' has pivotally secured thereto by means of bolt 20, the upper end of a hanger arm 21, the said arm being mounted upon a spacing washer 22 which is carried by the bolt 20 so that the nut 23 upon the outer end of this bolt may be tightly adjusted to hold the parts in position without binding the hanger arm. This end of the hanger arm 21 is provided with spaced openings 24 to permit of adjustment of the arm. The lower end of the hanger arm 21 is pivotally secured to the rear end of the bolt 13 as shown at 24.

Secured upon the bolt 20 of the front attaching bracket 14 is one end of a bar 25. This bar extends longitudinally of the beam and has its other end secured to the cultivator at the point of connection of one of the handles 11 with the beam 10, as shown at 26. Pivotally secured to the bar 25 as indicated at 27 is the upper end of a front hanger arm 28 and this pivotal connection between the arm 28 and the bar 25 may also be provided with a spacing washer similar to the washer 22 to prevent binding. The lower end of the arm 28 is pivotally secured to the front end of the plate 13 as shown at 29 and this pivotal connection together with the pivotal connection 24 may be provided with spacing washers 30 to prevent binding, so that the plate 13 may have free pivotal movement. The lower end of the arm 28 is provided with spaced openings 31 to provide for adjustment.

The invention is susceptible of various changes in its form, proportions and minor details of construction and the right is herein reserved to make such changes as properly fall within the scope of the appended claims.

Having described the invention what is claimed is:—

1. In combination with a cultivator having handles extending from its beam, of a guard plate adapted to extend longitudinally of the cultivator, front and rear attaching brackets, a bar having one end secured to the front bracket and its opposite end secured to the inner end of one of the cultivator handles at the point of connection of the latter with the cultivator beam, an arm having one end pivotally connected to the bar and its opposite end pivotally connected to the plate and a relatively long arm having one end pivotally connected to the plate and its other end pivotally connected to the cultivator handle.

2. In combination with a cultivator having handles attached to its beam, of a guard plate adapted to extend longitudinally of the cultivator, front and rear attaching brackets, means to adjust the brackets to the size of the cultivator beam and cultivator handles, a bar having one end connected to the front bracket and its opposite end secured to the inner end of one of the cultivator handles at the point of connection of the latter with the cultivator beam, an arm having one end pivotally connected to the bar and its opposite end pivotally connected to the plate and a relatively long arm having one end pivotally connected to the plate and its other end pivotally connected to the cultivator handle.

3. In combination with a cultivator having handles attached to its beam, of a guard plate adapted to extend longitudinally of the cultivator, front and rear attaching brackets, each of said brackets comprising a pair of overlapping sliding engaging substantially L-shaped plates having elongated registering slots in their overlapped portions, a bar extending longitudinally of the cultivator beam and having one end connected to the cultivator at the point of connection of one of the cultivator handles and beam, a bolt extending through the registering slots of the front bracket and connecting the other end of the bar to said bracket, an arm having one end pivotally connected to the bar and its opposite end pivotally connected to the plate and a relatively long arm having one end pivotally connected to the plate and its other end pivotally connected to the cultivator handle.

In testimony whereof I affix my signature.

JOSEPH D. WALKER.